(12) United States Patent
Inoue

(10) Patent No.: US 11,695,347 B2
(45) Date of Patent: Jul. 4, 2023

(54) ELECTRIC POWER CONVERTER

(71) Applicant: Mitsubishi Electric Corporation, Tokyo (JP)

(72) Inventor: Kosuke Inoue, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 17/358,237

(22) Filed: Jun. 25, 2021

(65) Prior Publication Data
US 2022/0069727 A1 Mar. 3, 2022

(30) Foreign Application Priority Data
Aug. 27, 2020 (JP) ................. 2020-143182

(51) Int. Cl.
*H02M 3/335* (2006.01)
*H02M 7/00* (2006.01)
*H02M 3/00* (2006.01)

(52) U.S. Cl.
CPC ........... *H02M 7/003* (2013.01); *H02M 3/003* (2021.05); *H02M 3/33569* (2013.01); *H02M 3/33573* (2021.05)

(58) Field of Classification Search
CPC .. H02M 7/003; H02M 3/335; H02M 3/33569; H02M 7/02; H02M 7/04; H02M 7/06
See application file for complete search history.

(56) References Cited

U.S. PATENT DOCUMENTS

2012/0257419 A1* 10/2012 Kaneko ................. H01F 27/306
336/198
2016/0248333 A1 8/2016 Nakazawa et al.

FOREIGN PATENT DOCUMENTS

| JP | 5506966 B1 | 5/2014 |
| JP | 5683672 B1 | 3/2015 |
| JP | 6516910 B1 | 5/2019 |
| WO | 2015/053141 A1 | 4/2015 |

OTHER PUBLICATIONS

Office Action dated Jul. 20, 2021 in Japanese Application No. 2020-143182.

* cited by examiner

*Primary Examiner* — Gary L Laxton
(74) *Attorney, Agent, or Firm* — Sughrue Mion, PLLC; Richard C. Turner

(57) ABSTRACT

Obtain an electric power converter by which a downsizing and a low cost can be realized in such a way that main components are standardized. A transformer and rectifier elements of a rectifier circuit are configured by using a single module, and a center tap is configured by laminating one pullout portion of a first secondary winding and one pullout portion of a second secondary winding, and a central connecting component is connected to a center tap and a terminal of a smoothing coil which composes a smoothing reactor.

21 Claims, 5 Drawing Sheets

ELECTRIC POWER CONVERTER

BACKGROUND OF THE INVENTION

Field of the Invention

The present application relates to an electric power converter in which an inverter circuit, a transformer, rectifier circuits, and a smoothing reactor are used.

Explanation of a Related Art

In an electric car or a hybrid car, an electric power converter such as a DC/DC step-down converter, is used in order to convert a voltage of a high voltage battery into a voltage of a 12V system, and in order to supply an electric power to a battery of a 12V system.

The DC/DC step-down converter includes a transformer, which includes a primary side winding and a secondary side winding; rectifier elements which rectify a voltage which is induced at the secondary side winding of the transformer; and a smoothing reactor which is connected to a secondary side coil of the transformer. When these components are attached to a cabinet, many components are required, whereby an assembly process of the electric power converter is complicated, and moreover, the many components become a cause of an increment of a size or a cost of the DC/DC step-down converter.

In Patent Document 1, it is suggested that a transformer, switching elements, and a smoothing reactor, which are components of a DC/DC step-down converter, are molded by using a resin and are integrated, by using an injection molding process, whereby a man-hour for assembling the components to a cabinet is reduced.

Patent Document 1

Japanese Patent Publication No. 6516910

However, in a conventional art, an arrangement of each of components or a pullout position of a connecting terminal is fixed, so that it is difficult that the components are standardized, in accordance with a car maker or a model of a car, in order to correspond to various required sizes or an interface position, and it causes that a cost of the components is increased. In particular, a transformer is configured by using a plurality of winding components, so that an internal configuration is complicated, and when a pullout position of a terminal is only changed, it is required that forms of many configuration components are changed.

SUMMARY OF THE INVENTION

The present application has been made to solve the above-described problems, and an object of the present application is to obtain an electric power converter in which main components are standardized, whereby the converter can be downsized, and a cost of the converter can be lowered.

An electric power converter, which is disclosed in the present application, includes: an inverter circuit; a transformer which is connected to an output side of the inverter circuit; rectifier elements which compose a rectifier circuit which is connected to an output side of the transformer; and a smoothing coil which composes a smoothing reactor which is provided at the output side of the transformer and is connected to an output circuit, which includes the rectifier elements, of the transformer; in which a center tap is provided, in the transformer, at a connecting portion of a first secondary winding and a second secondary winding, which compose a secondary winding; wherein the transformer and the rectifier elements are configured by using a single module, and a pullout portion is configured, at the center tap, by laminating an end portion of the first secondary winding and an end portion of the second secondary winding, and the pullout portion of the center tap and the smoothing coil are connected by using a connecting object.

According to the electric power converter which is disclosed in the present application, the transformer and the rectifier elements are configured by using a single module, and at the center tap, the end portion of the first secondary winding and the end portion of the second secondary winding are laminated so as to be configured, and the pullout portion of the center tap and the smoothing coil are connected by using the connecting object, so that the main components are standardized, whereby the electric power converter can be downsized, and a cost of the electric power converter can be lowered.

DETAILED EXPLANATION FOR THE INVENTION

Hereinafter, the electric power converters according to embodiments will be explained based on the drawings. In each of the drawings, the same symbols are assigned to the same or equivalent parts. The electric power converters according to the embodiments are applied to a DC/DC converter, and the electric power converters input a high voltage which is supplied from a high voltage battery which is mounted in a car, and the electric power converters output a voltage of a 12V system, which is used as an electric power source voltage for components of an auxiliary equipment system which is mounted in a car, from an output terminal.

Embodiment 1

Figure 1:
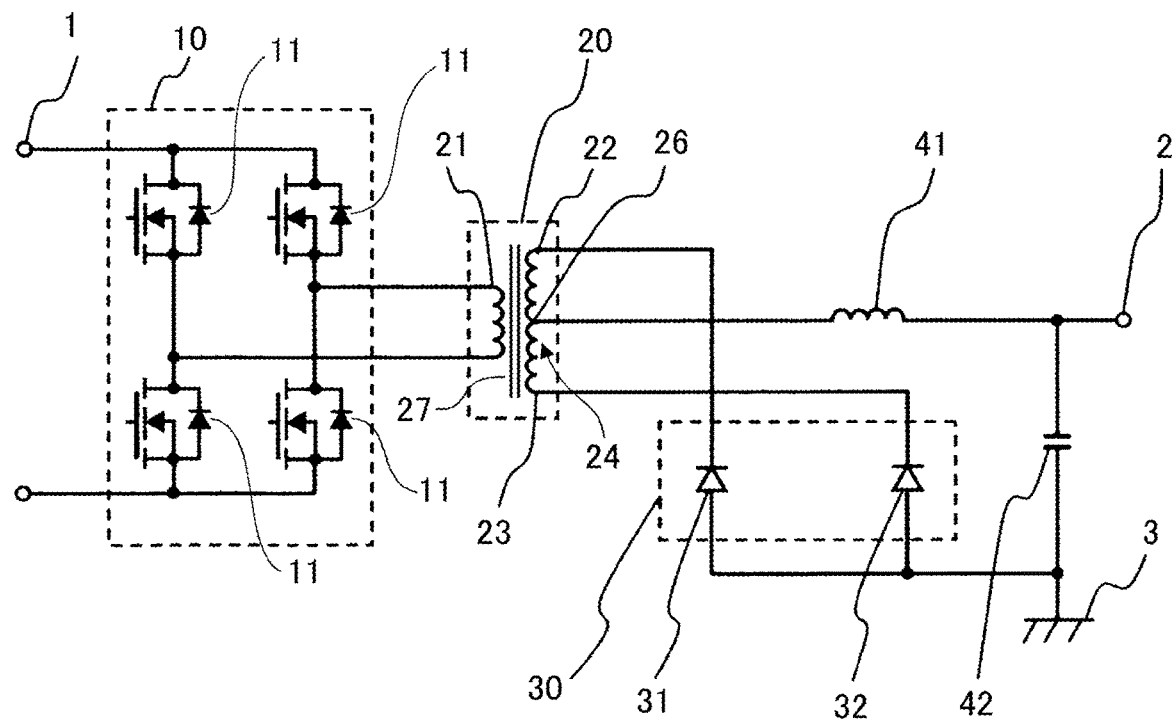
FIG. 1 is a circuit diagram which indicates one example of an electric power converter according to Embodiment 1.

FIG. 1 is a circuit configuration diagram of an electric power converter according to Embodiment 1.

The electric power converter includes an inverter circuit 10 in which a switching operation is performed for a DC electric power, which is inputted from an input terminal 1, at a high voltage, whereby the DC electric power is converted into an AC electric power; a transformer 20 which converts an electric power, which is supplied from the inverter circuit 10, into an electric power at a voltage which is corresponding to a ratio between winding numbers of a primary winding 21 and winding numbers of a secondary winding 24; a rectifier circuit 30, at which a secondary voltage of the transformer 20 is inputted, and a full-wave rectification process is performed, and moreover, the rectifier circuit 30 outputs an DC electric power; a smoothing circuit which is composed of a smoothing reactor 41 and a smoothing capacitor 42, by which an output voltage of the rectifier circuit 30 is rectified; and an output terminal 2 from which an output voltage from the transformer 20 is outputted via the rectifier circuit 30 and the smoothing circuit.

The inverter circuit 10 is configured by using a plurality of switching elements 11. A transformer 20 includes the primary winding 21 which is connected to an electric power source circuit side; the secondary winding 24 which includes a first secondary winding 22 (which is also refeed to as a secondary winding at an upper side) and a second secondary winding 23 (which is also refeed to as a secondary winding at a lower side), which are connected to a load circuit side; and a transformer core 27. A midpoint, which is used as a connecting portion of the first secondary winding 22 and the second secondary winding 23, is provided as a center tap 26 of the transformer 20.

The rectifier circuit 30 is configured by using a plurality of rectifier elements 31 and rectifier elements 32. The rectifier circuit 30 inputs a secondary voltage of the transformer 20, and rectifies an AC electric power, which is transmitted to the first secondary winding 22 and the second secondary winding 23, by using a plurality of the rectifier elements 31 and the rectifier elements 32.

When the rectifier elements 31 and the rectifier elements 32 are connected to the first secondary winding 22 and the second secondary winding 23 of the transformer 20, cathode sides of each of the rectifier elements 31 and the rectifier elements 32 are connected to end portion sides, which are not center tap sides, of the first secondary winding 22 and the second secondary winding 23, and anode sides of each of the rectifier elements 31 and the rectifier elements 32 are connected to a sheet metal component which is described later.

The sheet metal component is connected to a cabinet (which is not illustrated) of the electric power converter, and is electrically used as a ground portion 3.

The center tap 26 is connected to one end side of the smoothing reactor 41 which smooths an AC electric power which is rectified, and the other end side of the smoothing reactor 41 is connected to the output terminal 2 of the electric power converter.

Figure 2:
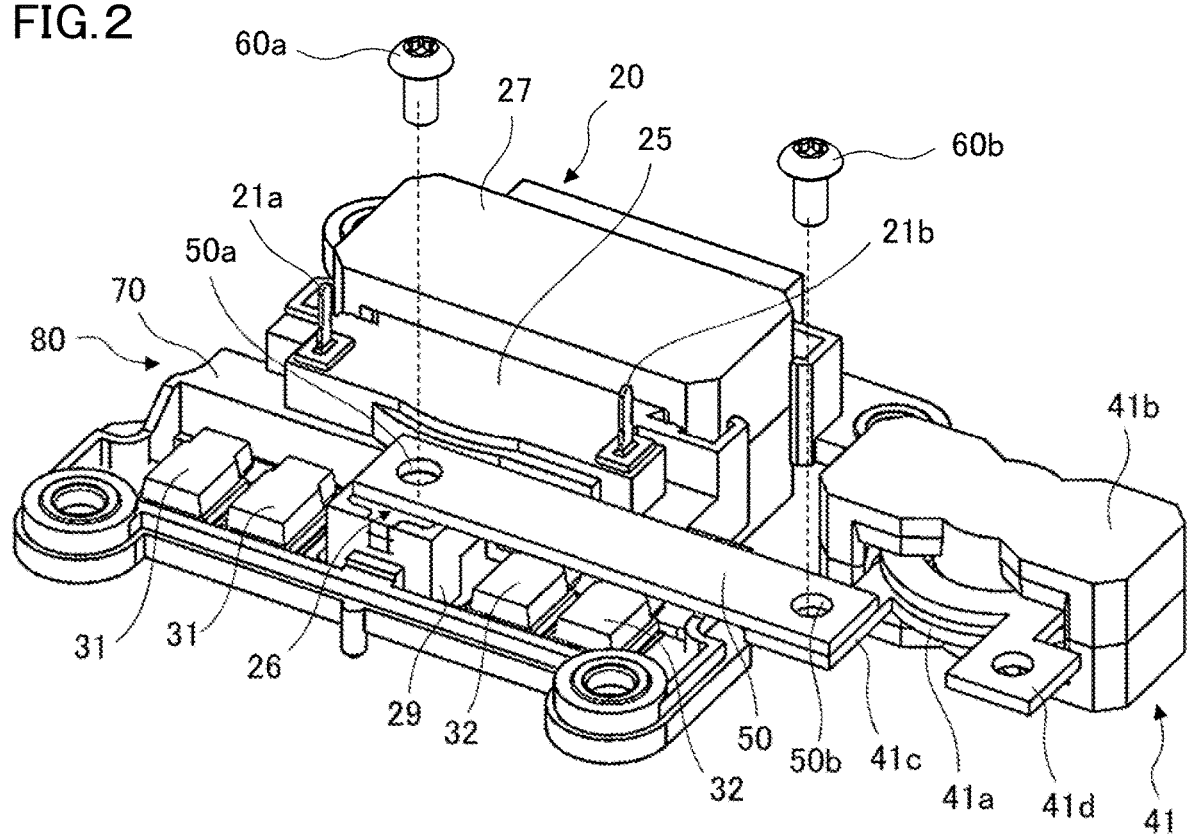
FIG. 2 is an oblique perspective view which indicates the electric power converter according to Embodiment 1.
Figure 3:
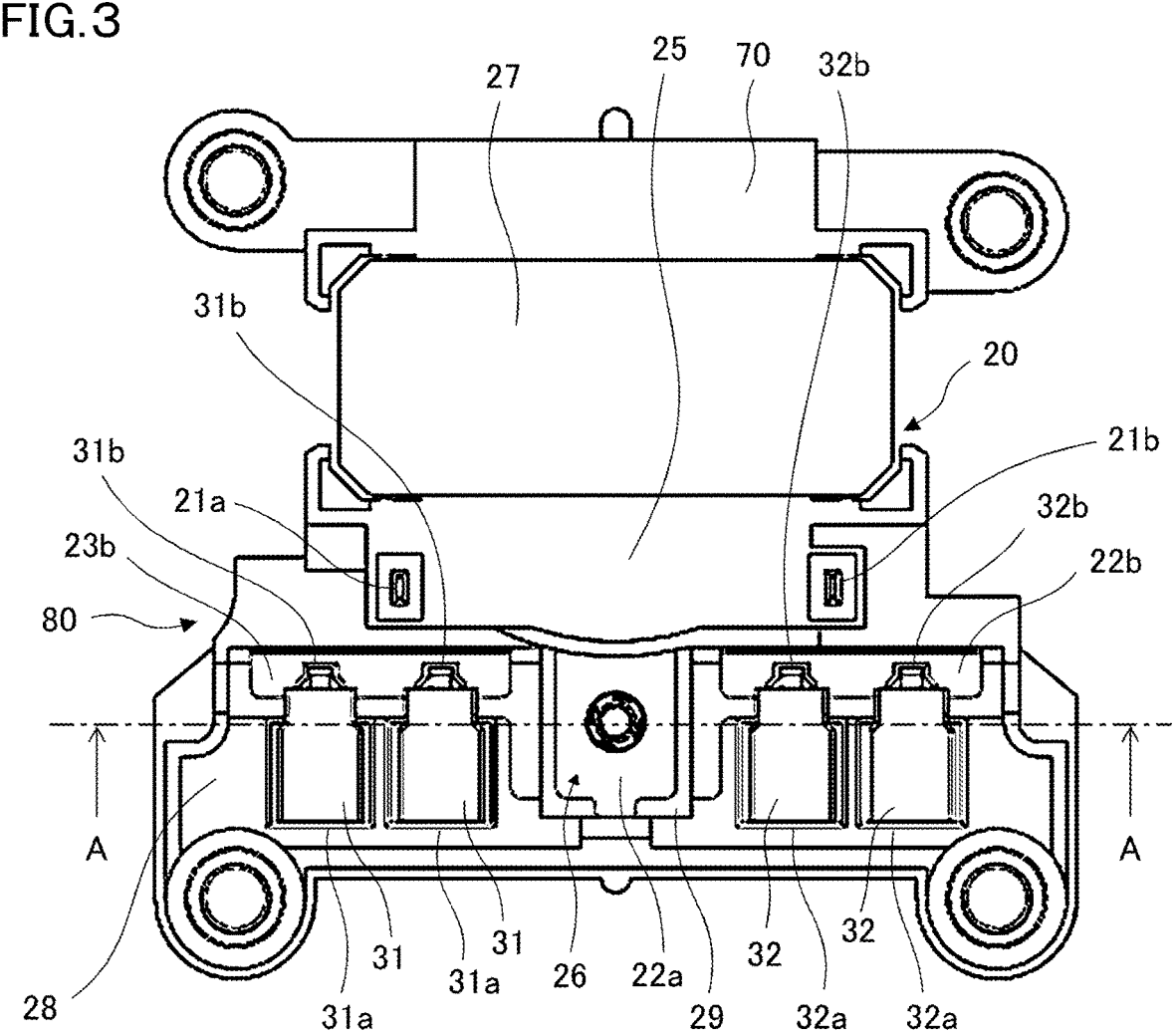
FIG. 3 is a plan view which indicates a module configuration of a transformer and rectifier elements in the electric power converter according to Embodiment 1.
Figure 4:
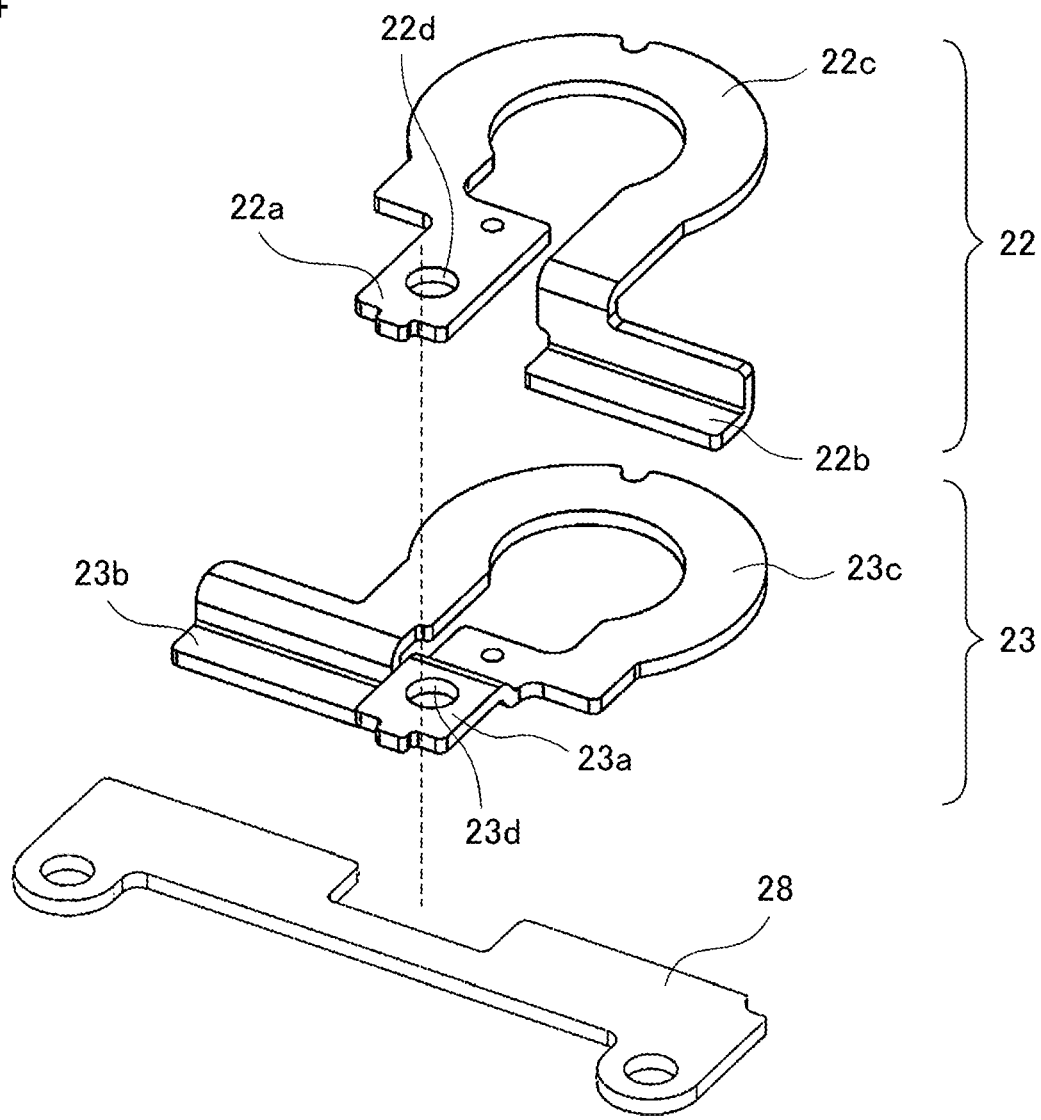
FIG. 4 is an oblique perspective view which indicates a configuration of secondary windings, in a state where the secondary windings are disassembled, in the electric power converter according to Embodiment 1.

FIG. 2 is an oblique perspective view and FIG. 3 is a plan view, which indicate a mounting configuration of the transformer 20, the rectifier elements 31, the rectifier elements 32, a central connecting component 50 which is used as a connecting object, and a smoothing reactor 41. A winding portion 25 is configured by using the primary winding 21 and the secondary winding 24. FIG. 4 is an oblique perspective view which indicates a configuration of the secondary windings, in a state where the secondary windings are disassembled. The transformer 20, the rectifier elements 31, and the rectifier elements 32 are integrally formed by using a single module 80, and the center tap 26 of the transformer 20 is electrically connected to the smoothing reactor 41 via the central connecting component 50. FIG. 2 and FIG. 3 indicate a case in which the two rectifier elements 31 and the two rectifier elements 32 are respectively included. The smoothing reactor 41 is provided at a position which is different from a position of a module 80, and the smoothing reactor 41 is configured by using of a smoothing coil 41a and a smoothing core 41b.

At the center tap 26, one pullout portion 22a, which is formed at an end portion of the first secondary winding 22, and one pullout portion 23a, which is formed at an end portion of the second secondary winding 23, are laminated, whereby a pullout portion is configured. Both end portions (one end portion 21a and the other end portion 21b) of the primary winding 21, the center tap 26, the other pullout portion 22b of the first secondary winding 22, the other pullout portion 23b of the second secondary winding 23, and a sheet metal component 28 are partly exposed from an insulative resin 70 which composes the module 80. The both end portions of the primary winding 21 are connected to the inverter circuit 10 via a control board or the like (which is not illustrated). Cathode terminals 31b of the rectifier elements 31 and cathode terminals 32b of the rectifier elements 31 are connected to the other pullout portion 22b of the first secondary winding 22 and the other pullout portion 23b of the second secondary winding 23, and moreover, anode terminals 31a of the rectifier elements 31 and anode terminals 32a of the rectifier elements 32 are connected to the sheet metal component 28 which is used as a board, and both anode terminals are mounted, by using solder, on a surface at the board, whereby the both anode terminals are connected.

At the central connecting component 50, a through hole 50a and a through hole 50b are provided at both end portions, and one end portion is commonly fastened, with the center tap 26, by using a through hole 22d which is formed at the pullout portion 22a of the first secondary winding 22, a through hole 23d which is formed at the pullout portion 23a of the second secondary winding 23, and a screw 60a which is inserted to the through hole 50a, and moreover, the other end portion is connected by using a terminal 41c, which is used as a terminal of the smoothing reactor 41, of the smoothing coil 41a, and a screw 60b which is inserted to the through hole 50b. The enter tap 26 and the terminal 41c of the smoothing coil 41a are formed at an identical plane height. A terminal 41d of the smoothing coil 41a is connected to the output terminal 2.

Modules of the transformer 20, the rectifier elements 31, and the rectifier elements 32 are formed by inserting the primary winding 21, the first secondary winding 22, the second secondary winding 23, and the sheet metal component 28, and by using the insulative resin 70. As illustrated in FIG. 4, the first secondary winding 22 and the second secondary winding 23 include an annular coil portion 22c of the first secondary winding 22 and an annular coil portion 23c of the second secondary winding 23, which are formed in such a way that a bending process is performed to sheet metals; the one pullout portion 22a, which includes the through hole 22d, of the first secondary winding 22, and the one pullout portion 23a, which includes the through hole 23d, of the second secondary winding 23; and the other pullout portion 22b and the other pullout portion 23b.

Figure 5:
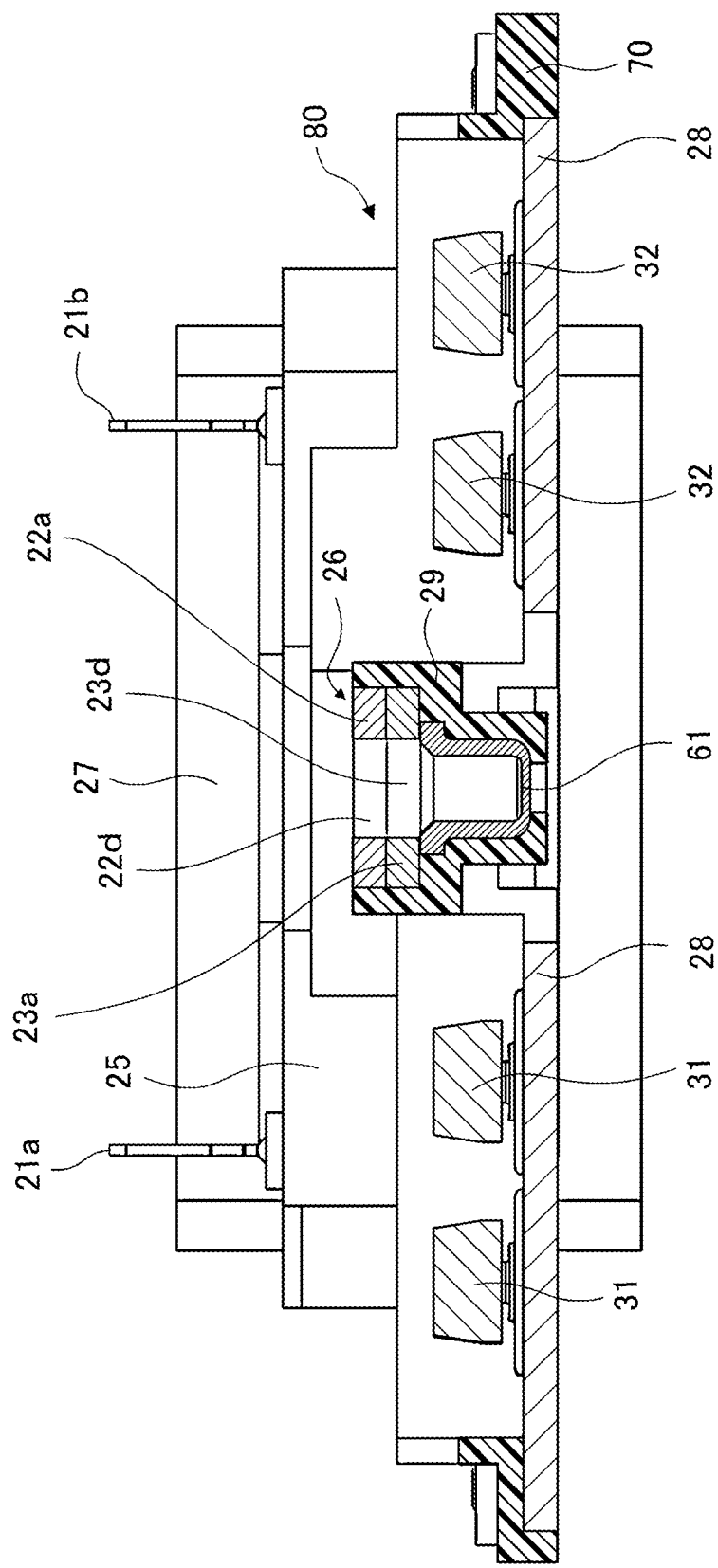
FIG. 5 is a cross-sectional view along "A-A line" at the electric power converter which is indicated in FIG. 3.

As illustrated in FIG. 5, the one pullout portion 22a, which is used as an end portion of the first secondary winding 22, and the one pullout portion 23a, which is used as an end portion of the second secondary winding 23, are laminated, whereby the center tap 26 of the transformer 20 is formed. As illustrated in FIG. 3, the other pullout portion 22b of the first secondary winding 22 and the other pullout portion 23b of the second secondary winding 23 are disposed at both neighboring areas of the center tap 26, and moreover, a position, at which the center tap 26 and the central connecting component 50 are connected, is higher than positions, at which the other pullout portion 22b and the other pullout portion 23b are connected to the rectifier elements 31 and the rectifier elements 32, with respect to a grounding surface which is used as an attaching surface of a cabinet of the electric power converter.

A holding portion 29 having a concave shape, in which the center tap 26 is housed, is formed at the insulative resin 70, and the pullout portion 22a of the first secondary winding 22 and the pullout portion 23a of the second secondary winding 23 are laminated so as to be disposed at upper space of the holding portion 29, and a nut 61 is inserted and formed at lower space, which is positioned at a cabinet side, of the holding portion 29. The holding portion 29 functions as a terminal board when the central connecting component 50 is joined to the center tap 26 by using the screw 60a, and the holding portion 29 maintains an insulation state with respect to the cabinet. Moreover, the center tap 26 electrically maintains an insulation state, by using the holding portion 29, with respect to the ground portion 3.

In the electric power converter according to Embodiment 1, at the center tap 26, the one pullout portion 22a of the first secondary winding 22 and the one pullout portion 23a of the second secondary winding 23 are laminated and configured, and the central connecting component 50, by which the transformer 20 and the smoothing reactor 41 are connected, is connected to the center tap 26 and the terminal 41c of the smoothing coil 41a which composes the smoothing reactor 41, and the transformer 20, and the rectifier elements 31 and the rectifier elements 32 in the rectifier circuit 30, are formed by using the single module 80, so that a downsizing and a low cost can be realized in such a way that main components are standardized.

When the transformer 20, the rectifier elements 31, and the rectifier elements 32 are integrally formed so as to be modularized, the rectifier elements 31 and the rectifier elements 32 are disposed at the both neighboring areas, which are easily treated as unnecessary areas, of the center tap 26 of the transformer 20, whereby space efficiency is improved, and moreover, the rectifier elements 31 and the rectifier elements 32 are linearly disposed at a plane which is orthogonalized in a terminal pullout direction of the center tap 26, whereby a route difference, between each of the rectifier elements, from the grand portion, via the rectifier elements 31 and the rectifier elements 32, to the transformer 20 is reduced, and a deviation of an impedance can be inhibited.

Moreover, the center tap 26 of the transformer 20 is disposed in such a way that a position of the center tap 26 is higher, with respect to the grounding surface which is used as the attaching surface of the cabinet, than positions of the rectifier elements 31 and the rectifier elements 32, whereby a pullout direction of the central connecting component 50, which is used as a connecting object, is not limited, and even while an arrangement flexibility of a position relation between the transformer 20 and the smoothing reactor 41 is improved, the transformer 20 and the smoothing reactor 41 can be connected in a state where a distance, between the two components, is the shortest.

The electric power converter is configured as described above, whereby forms of the transformer 20, the rectifier elements 31, the rectifier elements 32, and the smoothing reactor 41 are not changed, and when a format of the central connecting component 50, which is used as a connecting object, is only changed, the electric power converter can be corresponding to various required sizes or interface positions, and it can be realized that the components are standardized, and a cost can be lowered.

Moreover, when the electric power converter is assembled, it is only required that the rectifier elements are previously mounted, by using solder, on a surface at the board, and the components, which are integrally formed with the transformer 20, and the smoothing reactor 41 are disposed on the cabinet, and the central connecting component 50, which is used as a connecting object, is disposed on those components, and is connected by using the screw, so that an assembling process can be greatly reduced Moreover, the anode terminals 31a of the rectifier elements 31 and the anode terminals 32a of the rectifier elements 32 are connected to the single sheet metal component 28 which is formed by using one component, whereby a deviation of electric potentials between the rectifier elements 31 and the rectifier elements 32 can be minimally inhibited.

Embodiment 2

Figure 6:
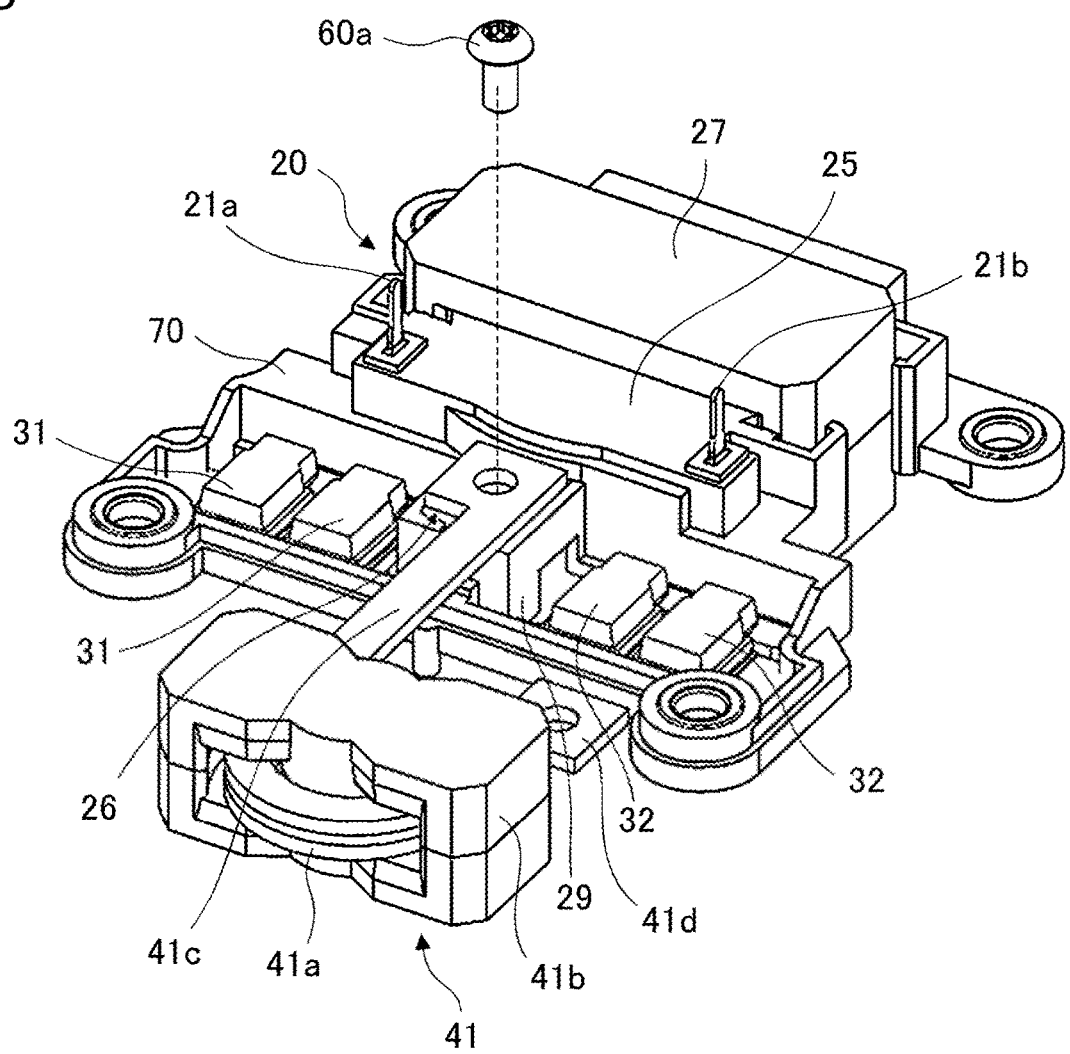
FIG. 6 is an oblique perspective view which indicates an electric power converter according to Embodiment 2.

FIG. 6 is an oblique perspective view which indicates a transformer 20, rectifier elements 31, rectifier elements 32, and a smoothing reactor 41 in an electric power converter according to Embodiment 2. In the electric power converter according to Embodiment 2, a connection configuration of the transformer 20 and the smoothing reactor 41 is different from a connection configuration of those components in the electric power converter according to Embodiment 1. The other configurations of the electric power converter according to Embodiment 2 are similar to the other configurations of the electric power converter according to Embodiment 1.

In the electric power converter according to Embodiment 2, a terminal 41c of a smoothing coil, which is used as a terminal of the smoothing reactor 41, is extended and outputted toward a center tap 26, whereby a component, which is corresponding to the central connecting component 50 which is used as a connecting object which is used in the electric power converter according to Embodiment 1, is integrally configured with the terminal 41c.

Thereby, in the electric power converter according to Embodiment 2, it is not required that a central connecting component, which is used as a connecting object, is individually provided by a similar way according to Embodiment 1, so that the number of components can be reduced, and a cost can be lowered.

In the present application, although various exemplary embodiments and examples are described, various characteristics, modes, and functions, which are described in one or a plurality of embodiments, are not limited to application of a particular embodiment, and can be applied to the embodiments in such a way that the characteristics, the modes, and the functions are singly used or used by using various combinations.

Therefore, an infinite number of deformation examples, which are not indicated, are assumed in an area of a technology which is disclosed in the specification of the present application. For example, it is assumed that the deformation examples include a case in which at least one of components is modified, or a case in which a component is added, or a case in which a component is omitted, and moreover, the deformation examples include a case in which at least one of components is extracted, and is combined to a component which is described in the other embodiment.

What is claimed is:
1. An electric power converter comprising:
an inverter circuit;
a transformer which is connected to an output side of the inverter circuit;

a rectifier circuit which is connected to an output side of the transformer, the rectifier circuit comprising rectifier elements;

a smoothing coil which composes a smoothing reactor which is provided at the output side of the transformer and is connected to an output circuit, which includes the rectifier elements, of the transformer; in which a center tap is provided, in the transformer, at a connecting portion of a first secondary winding and a second secondary winding, wherein the first secondary winding and the second secondary winding are a part of a secondary winding; and an insulative resin, wherein the transformer and the rectifier elements are configured as a single module by being within the insulative resin, and a pullout portion is configured, at the center tap, by laminating an end portion of the first secondary winding and an end portion of the second secondary winding, and the pullout portion of the center tap and the smoothing coil are connected by using a connecting object that extends from the pullout portion, past a lateral side of the insulative resin, and to the smoothing coil.

2. The electric power converter as recited in claim 1, wherein the rectifier elements are connected to each of another end portion of the first secondary winding and another end portion of the second secondary winding, and the rectifier elements are separately disposed at both neighboring areas of the center tap, and moreover, the rectifier elements are linearly disposed at a plane which is orthogonalized in a pullout direction of the center tap.

3. The electric power converter as recited in claim 1, wherein a position, at which the center tap and a terminal of the smoothing coil are connected, is higher than positions at which each of another end portion of the first secondary winding and another end portion of the second secondary winding is connected to the rectifier elements.

4. The electric power converter as recited in claim 2, wherein a position, at which the center tap and a terminal of the smoothing coil are connected, is higher than positions at which each of the other end portion of the first secondary winding and the other end portion of the second secondary winding is connected to the rectifier elements.

5. The electric power converter as recited in claim 1, wherein the rectifier elements are mounted on a surface at a board.

6. The electric power converter as recited in claim 2, wherein the rectifier elements are mounted on a surface at a board.

7. The electric power converter as recited in claim 3, wherein the rectifier elements are mounted on a surface at a board.

8. The electric power converter as recited in claim 4, wherein the rectifier elements are mounted on a surface at a board.

9. The electric power converter as recited in claim 1, wherein anode terminals of the rectifier elements are connected to a single sheet metal component that is within the insulative resin.

10. The electric power converter as recited in claim 2, wherein anode terminals of the rectifier elements are connected to a single sheet metal component that is within the insulative resin.

11. The electric power converter as recited in claim 3, wherein anode terminals of the rectifier elements are connected to a single sheet metal component that is within the insulative resin.

12. The electric power converter as recited in claim 1, wherein the connecting object is a central connecting component in a state where one end portion of the connecting object is connected to the center tap, and another end portion of the connecting object is connected to a terminal of the smoothing coil.

13. The electric power converter as recited in claim 2, wherein the connecting object is a central connecting component in a state where one end portion of the connecting object is connected to the center tap, and another end portion of the connecting object is connected to a terminal of the smoothing coil.

14. The electric power converter as recited in claim 3, wherein the connecting object is a central connecting component in a state where one end portion of the connecting object is connected to the center tap, and another end portion of the connecting object is connected to the terminal of the smoothing coil.

15. The electric power converter as recited in claim 1, wherein the connecting object comprises a terminal of the smoothing coil that is extended toward the center tap.

16. The electric power converter as recited in claim 2, wherein the connecting object comprises a terminal of the smoothing coil that is extended toward the center tap.

17. The electric power converter as recited in claim 3, wherein the connecting object comprises the terminal of the smoothing coil, and the terminal of the smoothing coil is extended toward the center tap.

18. The electric power converter as recited in claim 1, wherein through holes are provided at a connecting portion of the center tap and the connecting object, and the center tap and the connecting object are commonly fastened by a screw inserted in the through holes.

19. The electric power converter as recited in claim 2, wherein through holes are provided at a connecting portion of the center tap and the connecting object, and the center tap and the connecting object are commonly fastened by a screw inserted in the through holes.

20. The electric power converter as recited in claim 3, wherein through holes are provided at a connecting portion of the center tap and the connecting object, and the center tap and the connecting object are commonly fastened by a screw inserted in the through holes.

21. The electric power converter as recited in claim 3, wherein the center tap is at a higher position than positions of each of the other end portion of the first secondary winding and the other end portion of the second secondary winding, that are connected to the rectifier elements.

\* \* \* \* \*